United States Patent Office 3,374,189
Patented Mar. 19, 1968

3,374,189
2,4,6-TRISUBSTITUTED SULFONYLHYDRAZIDO-s-TRIAZINES AS BLOWING AGENTS FOR HIGH MOLECULAR WEIGHT ORGANIC POLYMERS
John E. Herweh and Algirdas C. Poshkus, Lancaster, Pa., assignors to Armstrong Cork Company, Lancaster, Pa., a corporation of Pennsylvania
No Drawing. Filed Nov. 1, 1965, Ser. No. 505,952
4 Claims. (Cl. 260—2.5)

ABSTRACT OF THE DISCLOSURE

A process for forming cellular organic polymeric compositions wherein 2,4,6-trisubstituted sulfonylhydrazido-s-triazines are incorporated in the polymer and decomposed with heat. The substituent groups on the triazine may be alkyl or arylalkylene.

---

This invention relates to the production of new chemical compounds and more particularly to new and useful sulfonylhydrazido-s-triazines. The invention is particularly concerned with the production of new 2,4,6-trisubstituted sulfonylhydrazido-s-triazines which are useful as blowing agents.

The chemical compounds of this invention may be represented by the following general formula:

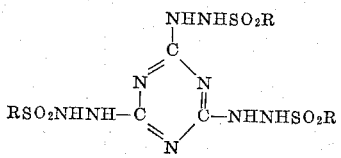

where R represents a radical selected from the group consisting of alkyl containing from 1 to about 10 carbon atoms and

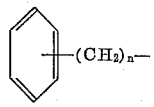

wherein $n$ is an integer from 1 to about 3.

Alkyl and arylalkylene sulfonylhydrazides may be conveniently converted to the subject compounds, 2,4,6-trisubstituted sulfonylhydrazido-s-triazines by the following reaction:

$(CNCl)_3 + 3RSO_2NHNH_2 \longrightarrow$

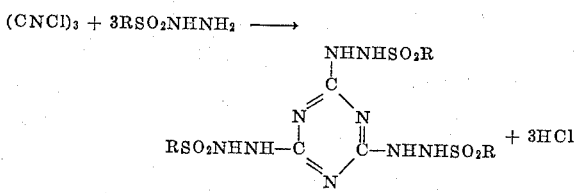

The reaction may be carried out in an inert nonpolar solvent such as benzene and toluene or in polar solvents which are nonreactive to both the cyanuric chloride and the sulfonylhydrazide, such as tetrahydrothiophene 1,1-dioxide or the dimethyl ether of tetraethylene glycol. Reactions carried out in benzene usually involve two phases due to the insoluble nature of the starting sulfonylhydrazide, those performed in the polar solvents mentioned are homogeneous initially. In all cases heat is necessary to facilitate the reaction, care being exercised however to insure that the reaction temperatures do not exceed the decomposition temperature of the starting sulfonylhydrazide. An excess of starting sulfonylhydrazide is used to compensate for hydrazide lost due to decomposition. The reaction product is insoluble in benzene and can be isolated by filtration and, where reactions are carried out in the polar solvents, the reaction mixture must be diluted with a nonsolvent in order to bring about product separation. The completeness of the reaction may be determined by the amount of hydrogen chloride evolved.

The 2,4,6-trisubstituted sulfonylhydrazido-s-triazines of this invention are amorphous white powders soluble in dimethylformamide, tetrahydrofuran, dimethyl ether of ethylene glycol, dimethyl ether of diethylene glycol, and dilute aqueous alkali and the alkyl derivatives are soluble in alcohol. In contrast, the subject compounds are insoluble in dilute mineral acids, water and common organic solvents such as benzene, and the arylalkylene derivatives are also insoluble in alcohol. Yields of the triazine derivatives are quite high.

The following examples are illustrative of specific embodiments of the present invention.

EXAMPLE 1

*Preparation of 2,4,6-tributanesulfonylhydyrazido-s-triazine*

To a stirred solution of cyanuric chloride (5.5 g., 0.03 mole) in 75 ml. of dry benzene at 60° and under a nitrogen atmosphere was added in ½ hour a solution of butanesulfonylhydrazide (15.2 g., 0.1 mole) in 50 ml. of benzene. After approximately one hour, hydrogen chloride was detected at the condenser head, the reaction mixture became increasingly turbid as a gummy semi-solid formed. Heating of the reaction mixture was continued at 75–80° for a total heating time of about 18½ hours.

The cooled reaction mixture was filtered to remove a white solid, the gelatinous filter-cake washed with ether was dried in vacuo. The dried solid (16.3 g.) melted at 170–175° with decomposition. Distillation of the combined benzene filtrate and ether washings at reduced pressure left 2 g. of a pale yellow viscous oil that was discarded.

The crude reaction product 16.3 g. was washed with cold water until washings were neutral. The dried water insoluble white solid (12 g.) melted at 180–184° with decompostion. Repeated recrystallization from aqueous ethanol gave material M.P. 194–197° with decomposition.

*Analysis.*—Calc'd for $C_{15}H_{33}N_9O_6S_3$: C, 33.7; H, 6.3; N, 23.8; S, 18.1; mol wt. 532.4. Found: C, 33.7; H, 6.2; N, 23.9; S, 18.1; mol wt. 530 [1]. Yield: 75%.

EXAMPLE 2

*Preparation of 2,4,6-tribenzylsulfonylhydrazido-s-triazine*

A slurry of benzylsulfonylhydrazide (15.8 g., 0.085 mole) in 215 ml. of dry toluene containing 4.6 g. (0.025 mole) of cyanuric chloride was heated at 100±5° C. with stirring under an $N_2$ atmosphere for 19½ hours. The cooled reaction mixture was filtered, the white filter-cake washed with ether and dried gave 17.04 g. of material M.P. 224–225° with decomposition. The combined washings and filtrate on distillation left 0.7 g. of a pale yellow solid, M.P. 105–107° C. after one recrystallization from 95% ethanol. The solid was identified as benzyl benzylthiolsulfonate by M.P. and infrared absorption spectra.

The major reaction product (17.04 g.) was washed repeatedly with water until neutral to litmus. The dried aqueous insolubles (16 g.) melted at 230–232° with decomposition. An analytical sample was prepared by repeatedly dissolving the reaction product in dimethylformamide (approximately 20 ml.) and adding the filtered solution to excess (200 ml.) cold water. Material treated in this manner melted at 232.5–233.5° C. with decomposition.

---

[1] Determined by Vapor Pressure Osmometry.

*Analysis.*—Calc'd for $C_{24}H_{27}N_9O_6S_3$: C, 45.5; H, 4.3; N, 20.0; S, 15.2; mol wt. 634.5. Found: C, 45.5; H, 4.3; N, 20.0; S, 15.1; mol wt. 640.8 [1]. Yield: 100%.

The following table illustrates the yield of gaseous decomposition products for both the n-butyl and benzyl derivatives prepared in accordance with the example. The s-triazine derivatives were decomposed in Nujol, a heavy refined paraffin oil (hydrocarbon), by slurrying the compound in 10 ml. of oil.

TABLE

| R= | Dec. Temp., °C. | Millimole of Blowing Agent | Vol. of Gas (ml. per Millimole) at a time (min.) | Half-life t0.5 (min.) |
|---|---|---|---|---|
| n-Butyl | 194 | 0.38 | 61 | 97 |
|  | 206.5 | 0.37 | 72 | 34 |
| Benzyl | 236 | 0.32 | 75 | 3.2 |
|  | 252 | 0.32 | 78 | 0.8 |

Nitrogen is the major gaseous decomposition product as shown by gas chromatography and accounted for about 40%–50% of the gaseous decomposition products. The compounds of this invention are useful as blowing agents for a variety of resinous blends, particularly those having moderate to high temperature processing requirements. They thus are useful in foaming, offering flexibility both in techniques and choice of compositions.

The following example illustrates the use of 2,4,6-tri-n-butanesulfonylhydrazido-s-triazine as a blowing agent in forming a cellular thermoplastic polyvinyl chloride foam.

EXAMPLE 3

*Plastisol formulation*

| Ingredient: | Weight (grams) |
|---|---|
| Polyvinyl chloride homopolymer resin having a specific gravity of 1.28 and a weight based on gel permeation chromotography of 55,400 (number average) and 91,400 (weight average) | 100 |
| Dioctylphthalate | 55 |
| Epoxidized soybean oil | 5 |
| Liquid calcium, zinc octoate stabilizer | 6 |
| 2,4,6 - tri - n - butanesulfonylhydrazide - s - triazine | 6 |

A layer of the thoroughly mixed plastisol formulation was formed on a release paper and fused and expanded for 5 minutes at 385° F. in a convection oven. This resulted in a fine celled flexible polyvinyl chloride foam having an average density of 36 pounds per cubic foot. The density of the plastisol formulation prior to fusion was 73.8 pounds per cubic foot.

The preferred percentage range for blowing agent is between about 3% to 15% by weight, based on the organic resin component.

We claim:

1. The process which comprises incorporating a sulfonylhydrazido-s-triazine having the formula:

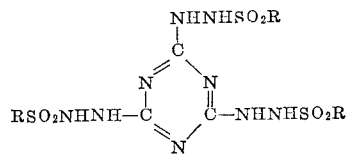

where R represents a radical selected from the group consisting of alkyl containing from 1 to about 10 carbon atoms and

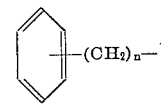

wherein $n$ is an integer from 1 to 3, in a plasticized high molecular weight organic resin and heating this mixture to a temperature above the decomposition point of said sulfonylhydrazido-s-triazine.

2. The process in accordance with claim 1 in which the sulfonylhydrazido-s-triazine is present in said mixture at between about 3% to 15% by weight, based on the weight of the organic resin.

3. The process in accordance with claim 2 in which the sulfonylhydrazido-s-triazine is 2,4,6-tri-n-butanesulfonylhydrazido-s-triazine.

4. The process in accordance with claim 2 in which the sulfonylhydrazido-s-triazine is 2,4,6-benzylsulfonylhydrazido-s-triazine.

References Cited

UNITED STATES PATENTS

| 2,211,709 | 8/1940 | Zerweck et al. | 260—249.6 |
| 2,766,226 | 10/1956 | Hardy et al. | 260—2.5 |
| 2,806,823 | 9/1957 | Sullivan | 260—2.5 |

MURRAY TILLMAN, *Primary Examiner.*

M. FOELAK, *Assistant Examiner.*

---
[1] Determined by Vapor Pressure Osmometry.